United States Patent [19]

Carlson

[11] 4,290,916

[45] * Sep. 22, 1981

[54] CATALYTIC COMPOSITE, METHOD OF MANUFACTURE, AND PROCESS FOR USE

[75] Inventor: David H. J. Carlson, Park Ridge, Ill.

[73] Assignee: UOP Inc., Des Plaines, Ill.

[ * ] Notice: The portion of the term of this patent subsequent to Jun. 30, 1998, has been disclaimed.

[21] Appl. No.: 111,752

[22] Filed: Jan. 14, 1980

Related U.S. Application Data

[63] Continuation-in-part of Ser. No. 80,638, Oct. 1, 1979.

[51] Int. Cl.$^3$ ............................................. B01J 31/32
[52] U.S. Cl. ................................ 252/430; 252/431 C; 252/431 N; 208/206; 208/207
[58] Field of Search ................ 252/430, 431 C, 431 N

[56] References Cited

U.S. PATENT DOCUMENTS

| | | | |
|---|---|---|---|
| 4,115,252 | 9/1978 | Antos | 252/441 X |
| 4,124,493 | 11/1978 | Frame | 252/431 N X |
| 4,157,312 | 6/1979 | Frame | 252/431 N X |
| 4,206,079 | 6/1980 | Frame | 252/431 N X |

Primary Examiner—Patrick Garvin
Attorney, Agent, or Firm—James R. Hoatson, Jr.; Gregory J. Mancuso; William H. Page, II

[57] ABSTRACT

Disclosed are a catalytic composite, and a method of preparing a catalytic composite, useful in the treatment of sour mercaptan-containing petroleum distillates, and a method of using the catalytic composite in treating sour petroleum distillates. More specifically, the method of preparation comprises contacting a molecular sieve support with a specified substituted ammonium compound, drying the resulting composite, thereafter contacting the resulting composite with an alkali metal hydroxide and a metal chelate, the alkali metal hydroxide being in a weight ratio with the adsorptive support of from about 0.1:1 to about 1:1, and thereafter drying the resulting catalytic composite. A sour petroleum distillate can be treated with the catalytic composite by contacting the distillate at oxidation conditions with the catalytic composite.

26 Claims, No Drawings

CATALYTIC COMPOSITE, METHOD OF MANUFACTURE, AND PROCESS FOR USE

BACKGROUND OF THE INVENTION

CROSS-REFERENCE TO RELATED APPLICATION

This application is a continuation-in-part of a copending application Ser. No. 80,638 filed on Oct. 1, 1979, said application hereby incorporated herein by reference thereto.

FIELD OF THE INVENTION

The field of art to which the claimed invention pertains is catalytic composites and processes useful for treating sour petroleum distillates. More specifically, the claimed invention relates to catalysts and catalytic processes especially useful for the treatment of sour petroleum distillates to effect the oxidation of mercaptans in the distillate to disulfides.

DESCRIPTION OF THE PRIOR ART

Processes for the treatment of sour petroleum distillates wherein the distillate is treated in contact with an oxidation catalyst in the presence of an oxidizing agent at alkaline reaction conditions have become well known and widely practiced in the petroleum refining industry. Said processes are typically designed to effect the oxidation of offensive mercaptans contained in a sour petroleum distillate with the formation of innocuous disulfides—a process commonly referred to as sweetening. The oxidizing agent is most often air. Gasoline, including natural, straight run and cracked gasolines, is the most frequently treated sour petroleum distillate. Other sour petroleum distillates include the normally gaseous petroleum fraction as well as naphtha, kerosene, jet fuel, fuel oil, lube oil, and the like.

A commonly used continuous process for treating sour petroleum distillates entails treating the distillate in contact with a metal phthalocyanine catalyst dispersed in an aqueous caustic solution to yield a doctor sweet product. The sour distillate and the catalyst-containing aqueous caustic solution provide a liquid-liquid system wherein mercaptans are converted to disulfides at the interface of the immiscible solutions in the presence of an oxidizing agent—usually air. Sour petroleum distillates containing more difficultly oxidizable mercaptans are more effectively treated in contact with a metal chelate catalyst disposed on a high surface area molecular sieve support—usually a metal phthalocyanine on an activated charcoal. The distillate is treated in contact with the supported metal chelate catalyst at oxidation conditions in the presence of an alkaline agent. One such process is described in U.S. Pat. No. 2,988,500. The oxidizing agent is most often air admixed with the distillate to be treated, and the alkaline agent is most often an aqueous caustic solution charged continuously to the process or intermittently as required to maintain the catalyst in a caustic-wetted state.

Heretofore, the practice of catalytically treating mercaptan-containing sour petroleum distillates has involved the introduction of alkaline agents, usually sodium hydroxide, into the sour petroleum distillate prior to or during the treating operation. (U.S. Pat. No. 3,108,081, U.S. Pat. No. 4,156,641) The prior art also suggest the addition to the petroleum distillate along with certain alkaline agents of certain non-alkaline additives. (U.S. Pat. No. 4,124,493, U.S. Pat. No. 4,033,860) In addition, the prior art suggests the use in an alkaline environment of certain catalytic composites produced from metal phthalocyanine solutions containing certain non-alkaline additives. (U.S. Pat. No. 4,157,312, U.S. Pat. No. 4,124,531) The prior art also discloses the use of alkanolamine hydroxide in the preparation of catalysts comprising a metal chelate on a molecular sieve support (U.S. Pat. No. 4,124,494, U.S. Pat. No. 4,159,964). Finally, the prior art suggests the use of certain chemicals, including sodium hydroxide, to increase the solubility of metal phthalocyanine in aqueous solutions from which metal phthalocyanine catalysts to be used in alkaline environments are made. (U.S. Pat. No. 3,108,081)

What has been needed is a catalytic composite of sufficient activity that addition to the petroleum distillate of an alkaline agent is not required. The composite of this invention is such a catalytic composite. The catalytic composite of this invention can be used in the treating process of this invention with or without the necessity of addition of an alkaline agent. The consequent savings in materials handling and storage expenses, and avoidance of use of hazardous alkaline chemicals in the treating process, have been long desired.

SUMMARY OF THE INVENTION

It is a broad objective of my invention to produce a novel catalyst of increased activity and stability compared with catalyst produced by prior art methods.

Another objective is to provide a process for treating a mercaptan-containing petroleum distillate in which said novel catalyst is used.

In brief summary, I have found that a catalyst especially useful in the treatment of sour petroleum distillates or fractions may be prepared by contacting a molecular sieve support with a substituted ammonium compound represented by the structural formula:

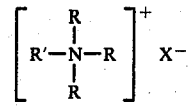

wherein R is a hydrocarbon radical containing up to about 20 carbon atoms and selected from the group consisting of alkyl, cycloalkyl, aryl, alkaryl and aralkyl, R' is a substantially straight-chain alkyl radical containing from about 5 to about 20 carbon atoms, and X is an anion selected from the group consisting of halide, nitrate, nitrite, sulfate, phosphate, acetate, citrate, tartrate, and hydroxide, drying the resulting composite, thereafter contacting the resulting composite with an alkali metal hydroxide and with a metal chelate, said alkali metal hydroxide being in a weight ratio with said molecular sieve support of from about 0.1:1 to about 1:1, and thereafter drying the resulting catalytic composite.

Another broad embodiment of this invention is a catalytic composite manufactured by the foregoing method.

In another of its broad aspects, the present invention embodies a method of treating a mercaptan-containing sour petroleum distillate by contacting the distillate at oxidation conditions with the catalytic composite described in the preceding paragraph.

Other objects and embodiments of this invention will become apparent in the following detailed description.

DESCRIPTION OF THE INVENTION

Any of the hydroxides of the metals of Group I-A of the Periodic Chart—the alkali metal hydroxides—can be used as a component of this invention. The alkali metal hydroxide component of this invention can be a single alkali metal hydroxide, or a mixture of two or more alkali metal hydroxides. The preferred alkali metal hydroxide for use in this invention is sodium hydroxide. Potassium hydroxide is also preferred. The alkali metal hydroxides are widely available commercially. They may be made by the electrolysis of aqueous alkali-salt solutions, usually the chloride salt, or by the hydration of alkali metal hydrides.

The metal chelate employed in the practice of this invention can be any of the various metal chelates known to the treating art as effective to catalyze the oxidation of mercaptans contained in a sour petroleum distillate with the formation of polysulfide oxidation products. Said metal chelates include the metal compounds of tetrapyridinoporphyrazine described in U.S. Pat. No. 3,980,582, e.g. cobalt tetrapyridinoporphyrazine; porphyrin and metaloporphyrin catalysts as described in U.S. Pat. No. 2,966,453, e.g. cobalt tetraphenylporphyrin sulfonate; corrinoid catalysts as described in U.S. Pat. No. 3,252,892, e.g. cobalt corrin sulfonate; chelate organometallic catalysts such as described in U.S. Pat. No. 2,918,426, e.g. the condensation product of an aminophenol and a metal of Group VIII; and the like. Metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, nickel phthalocyanine, platinum phthalocyanine, palladium phthalocyanine, copper phthalocyanine, silver phthalocyanine, zinc phthalocyanine, tin phthalocyanine and the like. Cobalt phthalocyanine and vanadium phthalocyanine are particularly preferred. The metal phthalocyanine is most frequently employed as a derivative thereof, the commercially available sulfonated derivatives, e.g. cobalt phthalocyanine monosulfonate, cobalt phthalocyanine disulfonate a mixture thereof being particularly preferred. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The molecular sieves used in this invention may be any of various types. Molecular sieves are crystalline metal aluminosilicates with a three-dimensional interconnecting network structure of silica and alumina tetrahedra. The tetrahedra are formed by four oxygen atoms surrounding a silicon or aluminum atom. Each oxygen atom has two negative charges and each silicon has four positive charges. This structure permits an ordered sharing arrangement, building tetrahedra uniformly in four directions.

In the crystalline structure, up to half of the quadravalent silicon atoms can be replaced by trivalent aluminum atoms. By regulating the ratios of the starting materials, it is possible to produce molecular sieves containing different ratios of silicon to aluminum ions and different crystal structures containing various cations.

In the most common commercial molecular sieve, Type A, the tetrahedra are grouped to form a truncated octahedron with a silica or alumina tetrahedron at each point. This structure is known as a sodalite cage.

When sodalite cages are stacked in simple cubic forms, the result is a network of cavities approximately 11.5 Å in diameter, accessible through openings on all six sides. These openings are surrounded by eight oxygen ions. In the sodium form, this ring of oxygen ions provides an opening "window" of 4.2 Å in diameter into the interior of the structure. The soda form of this crystalline structure is represented chemically by the following formula:

$$Na_{12}[(AlO_2)_{12}(SiO_2)_{12}]XH_2O$$

The water of hydration which fills the cavities during crystallization is loosely bound and can be removed by moderate heating. The number of water molecules in the structure can be as great as 27, making the water in the saturated formula 28.5% of the weight of the anhydrous molecular sieve. Molecular sieves can be readily produced with other metals substituting for a portion of the sodium.

The crystal structure of the Type X molecular sieve is built up by arraying the basic sodalite cages in a tetrahedral stacking with bridging across the six-membered oxygen atom ring. These rings provide opening "windows" 9–10 Å in diameter into the interior of the structure. The overall electrical charge is balanced by positively charged cation(s) as in the Type A structure. The chemical formula that represents the unit cell of Type X molecular sieve in the soda form is shown below:

$$Na_{86}[(AlO_2)_{36}(SiO_2)_{106}]XH_2O$$

As in the case of the Type A crystals, water of hydration can be removed by moderate heating. The value of X can be as great as 276, making the water in this type of molecular sieve 35% of the weight of the anhydrous molecular sieve.

The preferred form of molecular sieve for this invention is a Type X molecular sieve. Especially preferred is an anhydrous Type X molecular sieve with a nominal pore size of 10 Angstroms. Also especially preferred is a Type X molecular sieve of the soda form.

The substituted ammonium compound used in the method of preparation of this invention, represented by the structural formula shown above, is preferably a substituted ammonium hydroxide. The preferred substituted ammonium hydroxide is dimethylbenzylalkylammonium hydroxide, including benzyldimethyldodecylammonium hydroxide, benzyldimethyltetradecylammonium hydroxide, benzyldimethylhexadecylammonium hydroxide, benzyldimethyloctadecylammonium hydroxide, and the like. Other suitable substituted ammonium hydroxides include dimethylcyclohexyloctylammonium hydroxide, diethylcyclohexyloctylammonium hydroxide, dipropylcyclohexyloctylammonium hydroxide, dimethylcyclohexyldecylammonium hydroxide, diethylcyclohexyldodecylammonium hydroxide, dipropylcyclohexyldodecylammonium hydroxide, dimethylcyclohexyltetradecylammonium hydroxide, diethylcyclohexyltetradecylammonium hydroxide, dipropylcyclohexyltetradecylammonium hydroxide, dimethylcyclohexylhexadecylammonium hydroxide, diethylcyclohexylhexadecylammonium hydroxide, dipropylcyclohexylhexadecylammonium hydroxide, dimethylcyclohexyloctadecylammonium hydroxide, diethylcyclohexyloctadecylammonium hydroxide, dipropylcyclohexyloctadecylammonium hydroxide, and the like. Other suitable substituted ammonium hydroxides include those described in U.S. Pat. No. 4,156,641.

Other especially suitable substituted ammonium compounds include substituted ammonium halides. Suitable substituted ammonium halides are described in U.S. Pat. No. 4,124,493. The particularly preferred substituted ammonium halide is a dimethylbenzylalkylammonium chloride.

The preferred dimethylbenzylalkylammonium chlorides can be prepared by initially reacting ammonia and a $C_{12}$-$C_{18}$ carboxylic acid in contact with silica gel at about 500° C. to form a $C_{12}$-$C_{18}$ nitrile. The nitrile is then reduced with hydrogen in contact with a nickel catalyst at about 140° C. The resulting $C_{12}$-$C_{18}$ amine is separated from the reaction mixture and reacted with a 2 molar excess of methyl chloride. After neutralization of the reaction mixture, the amine is further reacted with 1 mole equivalent of benzylchloride to yield the desired dimethylbenzylalkylammonium chloride. The methylchloride, as well as the benzylchloride, is suitably reacted with the amine in methanolic solution at a temperature of about 150° C. The product can be used as is or further treated over activated charcoal to remove impurities.

The method of preparation of a catalytic composite of this invention comprises a stepwise process of first disposing a substituted ammonium compound on a molecular sieve support, drying the resulting composite, thereafter contacting the resulting composite with a metal chelate and an alkali metal hydroxide, and thereafter drying the resulting catalytic composite. The alkali metal hydroxide, substituted ammonium compound, and metal chelate are readily disposed on the molecular sieve support, and each can be disposed on the support in any conventional or otherwise convenient manner.

The substituted ammonium compound can be contacted with the molecular sieve support by soaking, suspending, dipping one or more times, or otherwise immersing the molecular sieve support in a solution of the substituted ammonium compound. One preferred method involves the use of a steam-jacketed rotary dryer. The molecular sieve support is immersed in an aqueous solution of the substituted ammonium compound contained in the rotary dryer and the support is tumbled therein by the rotary motion of the dryer.

The composite of the molecular sieve support and the substituted ammonium compound is dried prior to the second contacting step of this invention. Drying can be effected by applying steam to the dryer jacket. The composite can be dried under ambient temperature conditions, or at an elevated temperature is an oven, or in a flow of hot gases, or in any other suitable manner. Drying should be performed at a temperature below the temperature of thermal decomposition of the substituted ammonium compound.

An alternative and convenient method for contacting substituted ammonium compound with the molecular sieve support comprises predisposing the support in a sour petroleum distillate treating zone or chamber as a fixed bed and passing the substituted ammonium compound through the bed in order to contact the substituted ammonium compound with the molecular sieve support in situ. This method allows the substituted ammonium compound to be recycled one or more times to achieve a desired concentration of substituted ammonium compound on the molecular sieve support. In still another alternate method, the molecular sieve support can be predisposed in the treating zone or chamber, and the zone or chamber thereafter filled with the substituted ammonium compound to soak the support for a predetermined period. In any event, a contact time of at least 60 minutes is preferred.

After having contacted the molecular sieve support with the substituted ammonium compound and drying the resulting composite, the metal chelate and the alkali metal hydroxide can be contacted with the molecular sieve support in exactly the same manner as the substituted ammonium compound was contacted with the molecular sieve support. It is preferred for convenience to use the same method for contacting the molecular sieve support with the substituted ammonium compound, the alkali metal hydroxide, and the metal chelate. Use of a steam-jacketed rotary dryer as discussed above is especially preferred.

The metal chelate and the alkali metal hydroxide may be contacted with the molecular sieve support simultaneously from a common aqueous solution and/or dispersion thereof, or separately in any desired sequence. It is preferred that the alkali metal hydroxide be in a weight ratio with the molecular sieve support of from about 0.1:1 to about 1:1. It is especially preferred that the alkali metal hydroxide be in a weight ratio with the molecular sieve support of from about 0.3:1 to about 0.5:1, and that the substituted ammonium compound be in a weight ratio with the molecular sieve support of from about 0.1:1 to about 0.3:1. Because the mixing of the molecular sieves and the alkali metal hydroxide is exothermic, it is preferred to perform the mixing by means which will maintain the temperature of the molecular sieves below their fracture point. It has heretofore been the practice to oxidize the mercaptans contained therein in the presence of an alkaline agent. With respect to the method of this invention, those distillates containing the more readily oxidized mercaptans can be treated in the absence of added alkaline agent. A sour petroleum distillate is passed in contact with the catalytic composite of this invention. The catalytic composite can be dispersed within the distillate, or it can be dissolved as a fixed bed in a container. The contacting can be batch-type, or continuous. A continuous treating operation using a fixed bed of the catalytic composite is preferred. An oxidizing agent, preferably air, is introduced to contact the distillate and the catalytic composite to provide at least the stoichiometric amount of oxygen required to oxidize the mercaptan content of the distillate. It may be preferable in treating distillates with high mercaptan content to contact the catalytic composite with an alkaline agent prior to contacting the distillate and the catalytic composite with each other.

Treatment of sour petroleum distillates in contact with the catalytic composite of this invention can be performed in the presence of an alkaline agent as heretofore practiced, if desired. The catalytic composite is initially saturated with an alkaline agent, and an alkaline agent thereafter passed in contact with the catalyst bed, continuously or intermittently as required, admixed with the sour petroleum distillate. Any suitable alkaline agent may be employed. An alkali metal hydroxide in aqueous solution, e.g. sodium hydroxide in aqueous solution, is most often employed. The solution may further comprise a solubilizer to promote mercaptan solubility, e.g. alcohol, and especially methanol, ethanol, n-propanol, isopropanol, etc., and also phenols, cresols, and the like. A particularly preferred alkaline agent is an aqueous caustic solution comprising from about 2 to about 30 wt.% sodium hydroxide. The solubilizer, when employed, is preferably methanol, and the alkaline solution may suitably comprise from about 2 to about 100 vol.% thereof. Sodium hydroxide and potassium hydroxide constitute the preferred alkaline agents. Others including lithium hydroxide, rubidium hydroxide and cesium hydroxide are also suitably employed.

The method of treating of this invention can be effected in accordance with prior art treating conditions. The process is usually effected at ambient temperature conditions, although higher temperatures up to about 105° C. are suitably employed. Pressures of up to about 1,000 psi or more are operable, although atmospheric or substantially atmospheric pressures are entirely suitable. Contact times equivalent to a liquid hourly space velocity of from about 0.5 to about 10 or more are effective to achieve a desired reduction in the mercaptan content of a sour petroleum distillate, an optimum contact time being dependent on the size of the treating zone, the quantity of catalyst contained therein, and the character of the distillate being treated.

As previously stated, sweetening of the sour petroleum distillate is effected by oxidizing the mercaptan content thereof to disulfides. Accordingly, the process is effected in the presence of an oxidizing agent, preferably air, although oxygen or other oxygen-containing gas may be employed. In fixed bed treating operations, the sour petroleum distillate may be passed upwardly or downwardly through the catalytic composite. The sour petroleum distillate may contain sufficient entrained air, but generally added air is admixed with the distillate and charged to the treating zone concurrently therewith. In some cases, it may be of advantage to charge the air separately to the treating zone and countercurrent to the distillate separately charged thereto.

As heretofore mentioned, the substituted ammonium compound, alkali metal hydroxide and metal chelate components of the catalytic composite of this invention are readily adsorbed on the molecular sieve support. Thus, any of the said components which may in time be leached from the support and carried away in the reactant stream can be easily restored to the catalytic composite in situ by introducing either or any of said components to the sweetening process, for example, in admixture with the distillate being treated to be disposed on the solid molecular sieve support in the treating zone.

The following examples are presented in illustration of certain preferred embodiments of this invention and are not intended as undue limitations on the generally broad scope of the invention as set out in the appended claims.

EXAMPLE I

In this example, an actuated charcoal supported cobalt phthalocyanine monosulfonate catalyst was prepared in accordance with prior art practice by adsorbing the cobalt phthalocyanine monosulfonate on an activated charcoal support from a methanolic dispersion thereof. Thus, 150 mg. of cobalt phthalocyanine monosulfonate was admixed with 50 ml. of methanol and stirred for about 5 minutes. The resulting dispersion was then further diluted to 300 ml. with methanol with an additional 5 minutes of stirring. About 100 cc. of the activated charcoal particles, having an average bulk density of about 0.25 gm/cc and a particle size in the $10\times30$ mesh range, was immersed in the methanol dispersion, and the dispersion was stirred in contact with the particles for about 5 minutes and then maintained in contact with the particles for 1 hour under quiescent conditions. The methanolic dispersion was thereafter evaporated to dryness over a steam bath in contact with the charcoal particles, and the resulting particles were subsequently oven dried at 100° C. for 1 hour.

EXAMPLE II

This example illustrates one embodiment of this invention. A 50 wt. % solution of isopropyl alcohol and dimethylbenzyl-n-alkylammonium chloride was prepared. The dimethylbenzyl-n-alkylammonium chloride comprised dimethylbenzyldodecylammonium chloride (61%), dimethylbenzyltetradecylammonium chloride (23%), dimethylbenzylhexadecylammonium chloride (11%), and dimethylbenzyloctadecylammonium chloride (5%). About 100 cc. of clean, dry, $8\times12$ mesh molecular sieves were admixed with 10 wt. % of the foregoing substituted ammonium chloride. The molecular sieves were of the X-type with an aluminasilicate base and an average pore size of 10 Angstroms. The cation was sodium. The molecular sieves were maintained in contact with the substituted ammonium chloride for approximately 60 minutes. The admixture was thereafter evaporated to dryness over a steam bath to form a composite. Thereafter, a mixture of 150 mg. of cobalt phthalocyanine monosulfonate and 150 ml. of 7 wt. % aqueous sodium hydroxide was admixed with the aforesaid composite. The composite was maintained in contact with the aforesaid mixture for approximately 60 minutes. The resulting admixture was thereafter washed with deionized water until the effluent was of neutral (6–7) pH. The resulting admixture was thereafter evaporated to dryness over a steam bath to form one embodiment of the catalytic composite of this invention.

EXAMPLE III

A comparative evaluation of the catalytic composite of the foregoing Example I and Example II was effected in the following manner. This example illustrates another embodiment of this invention. In each case, 100 cc. of the catalyst was disposed as a fixed bed in a vertical glass tubular reactor maintained at ambient temperature conditions—about 80° to 85° F. Air was charged to the system through a rotameter at about 200 cc. per hour and admixed with a sour kerosene feedstock. The kerosene feedstock contained 1028 ppm mercaptan sulfur. The mixture was processed downwardly through the catalyst bed at a liquid hourly space velocity of about 1 over a 20 hour period. The reactor effluent was monitored and analyzed periodically for mercaptan sulfur.

The following table sets forth the results of the foregoing examples. Run I corresponds to the run of Example III wherein the catalytic composite of Example I was used. Run II corresponds to the run of Example III wherein the catalytic composite of Example II was used.

TABLE

| Time, Hrs. | Mercaptan Sulfur, wt. ppm. | |
| --- | --- | --- |
|  | Run I | Run II |
| 0 | 1028 | 1028 |
| 1 | 372 | 158 |
| 5 | 475 | 118 |
| 10 | 500 | 161 |
| 15 | 496 | 181 |
| 20 | 500 | 291 |

The above results clearly indicate the superiority of the catalytic composite of this invention over a catalytic composite prepared in a conventional manner. Notwithstanding the fact that the catalytic composite of Example II had been water washed until the effluent was of neutral pH, to remove excess alkali metal hydroxide and quaternary ammonium hydroxide, the catalytic composite of Example II was more effective than the catalytic composite of Example I in treating a sour petroleum distillate.

I claim as my invention:

1. A method of manufacture of a catalytic composite which comprises contacting a molecular sieve support with a substituted ammonium compound represented by the structural formula:

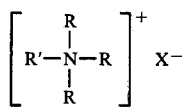

wherein R is a hydrocarbon radical containing up to about 20 carbon atoms and selected from the group consisting of alkyl, cycloalkyl, aryl, alkaryl and aralkyl, R' is a substantially straight-chain alkyl radical containing from about 5 to about 20 carbon atoms, and X is an anion selected from the group consisting of halide, nitrate, nitrite, sulfate, phosphate, acetate, citrate, tartrate and hydroxide, drying the resulting composite, thereafter contacting the resulting composite with a metal chelate and with an alkali metal hydroxide, said alkali metal hydroxide being in a weight ratio with said molecular sieve support from about 0.1:1 to about 1:1, and thereafter drying the resulting catalytic composite.

2. The method of claim 1 wherein one R radical is an alkyl radical containing about 12 to about 18 carbon atoms, another R radical is a benzyl radical, and X is an hydroxide.

3. The method of claim 1 wherein said molecular sieve support is a Type X molecular sieve.

4. The method of claim 1 wherein said molecular sieve is a Type X molecular sieve of the soda form.

5. The method of claim 1 wherein said alkali metal hydroxide is in a weight ratio with said molecular sieve support of from about 0.3:1 to about 0.5:1.

6. The method of claim 1 wherein said alkali metal hydroxide is in a weight ratio with said molecular sieve support of from about 0.3:1 to about 0.5:1 and said substituted ammonium compound is in a weight ratio with said molecular sieve support of from about 0.1:1 to about 0.3:1.

7. The method of claim 1 wherein said substituted ammonium compound is dimethylbenzylalkylammonium hydroxide.

8. The method of claim 1 wherein said substituted ammonium compound is a substituted ammonium halide.

9. The method of claim 1 wherein said substituted ammonium compound is dimethylbenzylalkylammonium chloride.

10. The method of claim 1 wherein said alkali metal hydroxide is sodium hydroxide.

11. The method of claim 1 wherein said alkali metal hydroxide is potassium hydroxide.

12. The method of claim 1 wherein said metal chelate is a metal phthalocyanine.

13. The method of claim 1 wherein said metal chelate is cobalt phthalocyanine monosulfonate.

14. A catalytic composite manufactured by the method of claim 1.

15. A catalytic composite manufactured by the method of claim 2.

16. A catalytic composite manufactured by the method of claim 3.

17. A catalytic composite manufactured by the method of claim 4.

18. A catalytic composite manufactured by the method of claim 5.

19. A catalytic composite manufactured by the method of claim 6.

20. A catalytic composite manufactured by the method of claim 7.

21. A catalytic composite manufactured by the method of claim 8.

22. A catalytic composite manufactured by the method of claim 9.

23. A catalytic composite manufactured by the method of claim 10.

24. A catalytic composite manufactured by the method of claim 11.

25. A catalytic composite manufactured by the method of claim 12.

26. A catalytic composite manufactured by the method of claim 13.

* * * * *